(12) United States Patent
Kleinsasser

(10) Patent No.: US 7,549,393 B2
(45) Date of Patent: Jun. 23, 2009

(54) FEEDER FOR ANIMALS

(75) Inventor: Jonathan Kleinsasser, Manitoba (CA)

(73) Assignee: Crystal Spring Colony Farms Ltd., Ste. Agathe, Manitoba (CA)

( * ) Notice: Subject to any disclaimer, the term of this patent is extended or adjusted under 35 U.S.C. 154(b) by 169 days.

(21) Appl. No.: 11/759,771

(22) Filed: Jun. 7, 2007

(65) Prior Publication Data

US 2008/0302306 A1  Dec. 11, 2008

(51) Int. Cl.
*A01K 5/00* (2006.01)
*A01K 5/01* (2006.01)

(52) U.S. Cl. .................... 119/52.4; 119/53; 119/51.5; 119/56.1; 119/52; 119/54

(58) Field of Classification Search ............... 119/51.5, 119/53.5, 53, 52.1, 52.4, 54, 56.1, 51.11, 119/61.2
See application file for complete search history.

(56) References Cited

U.S. PATENT DOCUMENTS

| | | | |
|---|---|---|---|
| 4,377,130 A * | 3/1983 | Schwieger | ................. 119/51.5 |
| 4,660,508 A | 4/1987 | Kleinsasser | |
| 4,911,727 A * | 3/1990 | King | ........................... 119/53 |
| 5,036,798 A * | 8/1991 | King | ........................ 119/53.5 |
| 5,603,285 A * | 2/1997 | Kleinsasser | .................. 119/53 |
| 5,640,926 A | 6/1997 | Kleinsasser | |
| 5,967,083 A * | 10/1999 | Kleinsasser | .................. 119/53 |

* cited by examiner

*Primary Examiner*—Lynda Jasmin
*Assistant Examiner*—Shadi Baniani
(74) *Attorney, Agent, or Firm*—Adrian D. Battison; Ade & Company Inc.

(57) ABSTRACT

A two sided feeder for feeding animals as they grow from a first smaller size to a larger size includes a trough with a shelf mounted above the base of the trough with a feed hopper positioned for depositing feed onto the shelf and a water pipe formed from a rectangular tube and extending along the trough at a position underneath the shelf with a plurality of water nipples at spaced positions along the water pipe. A plurality of divider members are clamped on the pipe each between two of the water nipples such that the divider members together act to separate one side of the trough from the other side to prevent the passage therebetween of the animals when at the smaller size.

5 Claims, 3 Drawing Sheets

FEEDER FOR ANIMALS

This invention relates to a feeder for animals which can accommodate animals of different size as the animals grow from a smaller size to a larger size.

BACKGROUND OF THE INVENTION

In U.S. Pat. No. 4,660,508 of the present inventor is disclosed a feeder for animals, of the type for feeding dry feed in particulate form, which includes a substantially horizontal shelf beneath a hopper so that the feed from the hopper is discharged onto the shelf and the amount of feed discharged can be controlled by small adjustment of the height of a lowermost edge of the hopper relative to the shelf. The shelf is located above a trough with a base and a front wall of the trough over which the animal can reach to take feed from the shelf and any feed which is moved from the shelf to the trough by the animal. Beneath the shelf is a water pipe extending along the feeder with nozzles to be operated by the pigs which discharge downwardly into the trough.

This type of feeder has become very successful and is widely known as a wet/dry feeder in view of the fact that the animal can take dry feed from the shelf of the feeder or can apply water into feed discharged into the trough to take the feed in the trough in wet condition.

Feeders of this type are generally double sided that is the feeder has two sides each of which can be accessed by a different set of animals so that generally the feeder is placed in a fence line to supply feed to animals in two separate pens. The feeder may however simply be placed in a pen and accessed from both sides. Of course a double sided feeder is cheaper to make than two single sided feeders.

In U.S. Pat. No. 5,640,926 of the present inventor issued Jun. 24, 1997 is disclosed a feeder of this type in which the height of the shelf from the trough is adjustable so as to accommodate a change in size of the animals from a smaller size up to a larger size as the animals grow. This feeder is commonly used to raise pigs from weanling up to a larger size such as "wean to finish". Thus the self is moved to a lowermost position for the very small weanlings and then raised as the animals grow. The difficulty with using a one-size feeder is that it must be sized to accommodate the largest size the animals reach and hence the feeder is too large for the weanlings. The weanlings can thus climb into the trough and can try to get under the shelf from one side to the other. This is unsuitable and potentially dangerous for the animals in that they can get stuck. It is known therefore to weld on the water pipe downwardly extending bars which reach to a position close to the trough so as to act as a barrier along the trough underneath the water pipe. Spaces are provided in the structure at the water nipples.

SUMMARY OF THE INVENTION

It is one object of the invention to provide an improved feeder of this type.

According to one aspect of the invention there is provided a feeder for feeding animals as they grow from a first smaller size to a larger size, comprising:

a trough having a base, a first side wall along one side edge over which the animals on one side can reach for taking feed from the trough and a second side wall along an opposed side edge over which the animals on the opposed side can reach for taking feed from the trough;

a shelf mounted above the base of the trough and arranged at a height such that the animals reaching over one of the sides of the trough can take feed from an adjacent one of the two sides of the shelf while reaching over the side wall and such that feed falling from the shelf is collected in the trough;

a feed hopper positioned above the shelf for depositing feed onto the shelf, the hopper having a lowermost edge arranged at a distance from the shelf which distance acts to control an amount of feed discharged from the hopper onto the shelf, and which distance together with the relative locations of the shelf and the lowermost edge acts to maintain the feed discharged on the shelf unless moved from the shelf by the animal;

a water pipe formed from a rectangular tube and extending along the trough at a position underneath the shelf;

a plurality of water nipples at spaced positions along the water pipe;

a plurality of divider members mounted on the pipe each between two of the water nipples such that the divider members together act to separate one side of the trough from the other side to prevent the passage therebetween of the animals when at the smaller size;

each of the divider members comprising a pair of depending legs with at least one cross bar interconnecting the legs;

each of the legs having at its upper end a clamping member defining a pair of side portions for engaging sides of the rectangular tube and a clamping fastener for pulling the side members together in a clamping action.

Preferably each leg is formed from a flat metal plate and the respective clamping member is formed by portions of the metal plate. However other constructions and other materials can be used.

Preferably the flat metal plate lies in a plane at right angles to the tube and the clamping portions of the metal plate are bent at right angles to the plane of the leg.

Preferably the flat metal plate forming the leg has a width substantially equal to a bottom wall of the rectangular tube and the clamping portions are formed at the sides of the leg at the upper end.

Preferably the clamping portions extend to a height above a top wall of the rectangular tube and the clamping fastener or bolt bridges the tube and connects the portions above the top wall.

Some of the important advantages which may be obtained are as follows.

1. Field installation without welding. Quite frequently now farmers change their animal husbandry system from a finisher system where only larger animals are introduced to the feeder to a "wean to finish" system where the weanlings are brought directly to the larger feeder and therefore have to add the barriers.

2. Using a welding system it was sometimes necessary to weld the rods on in the feeder rather than the tube (if the feeder was already installed in the barn). Now smaller mounting brackets are used so the square or rectangular water pipe complete with the barrier brackets can go straight down through the throat of the hopper of the feeder.

3. The clamping system allows the use of standard parts to fit many different models.

4. The present system of bolt-on clamping to a square water tube is much stronger than a round tube would be.

5. Using welded barriers, repair to a pipe requiring removal or the pipe would require the dividers to be cut off and re-welded to install the pipe again.

6. Flat bars can be bolted across from divider to divider. These are also removable and can be added by drilling some holes and bolting in place.

7. The water tube does not warp as much because of less welding.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
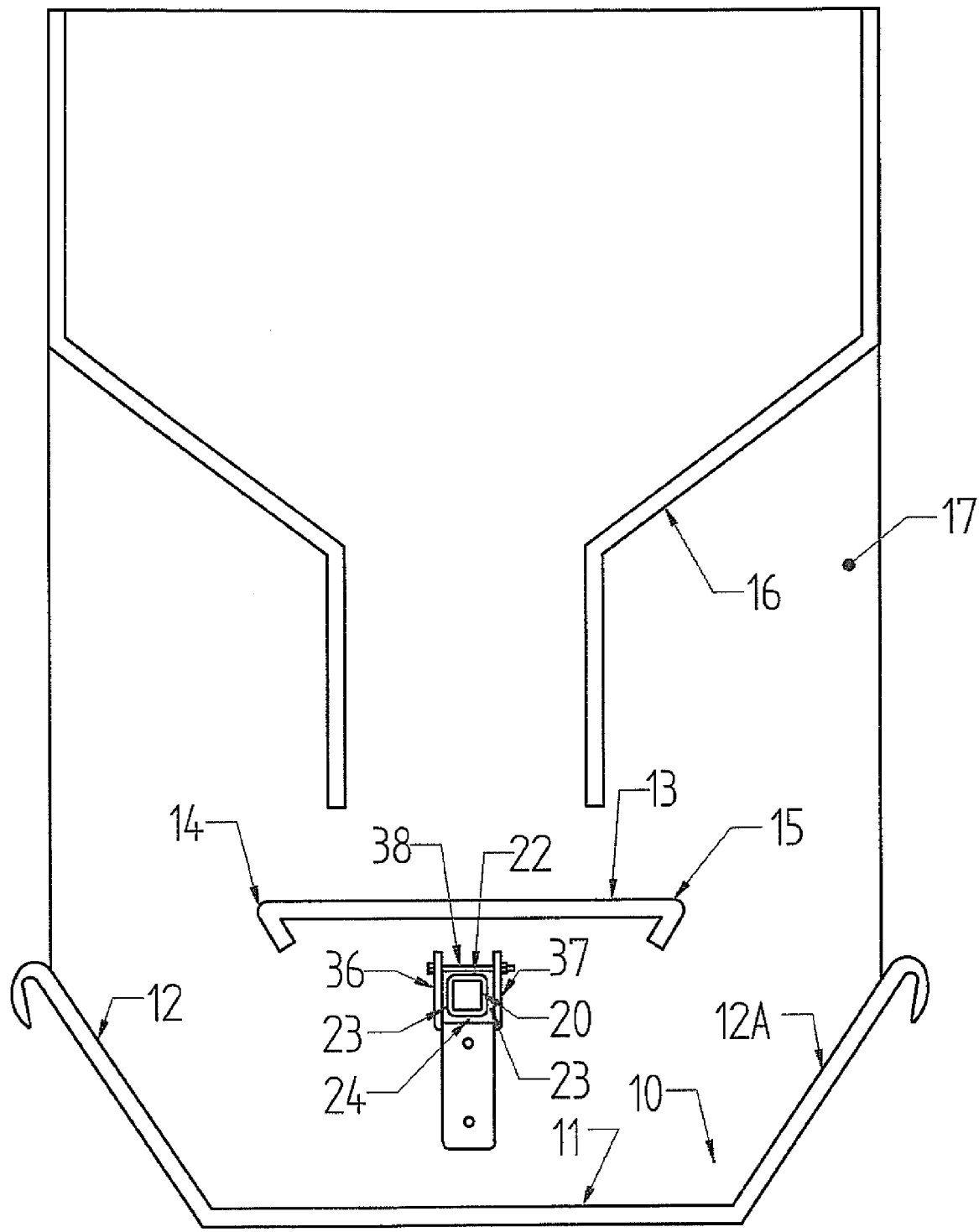
FIG. 1 is a transverse cross sectional view through a feeder according to the present invention
Figure 2:
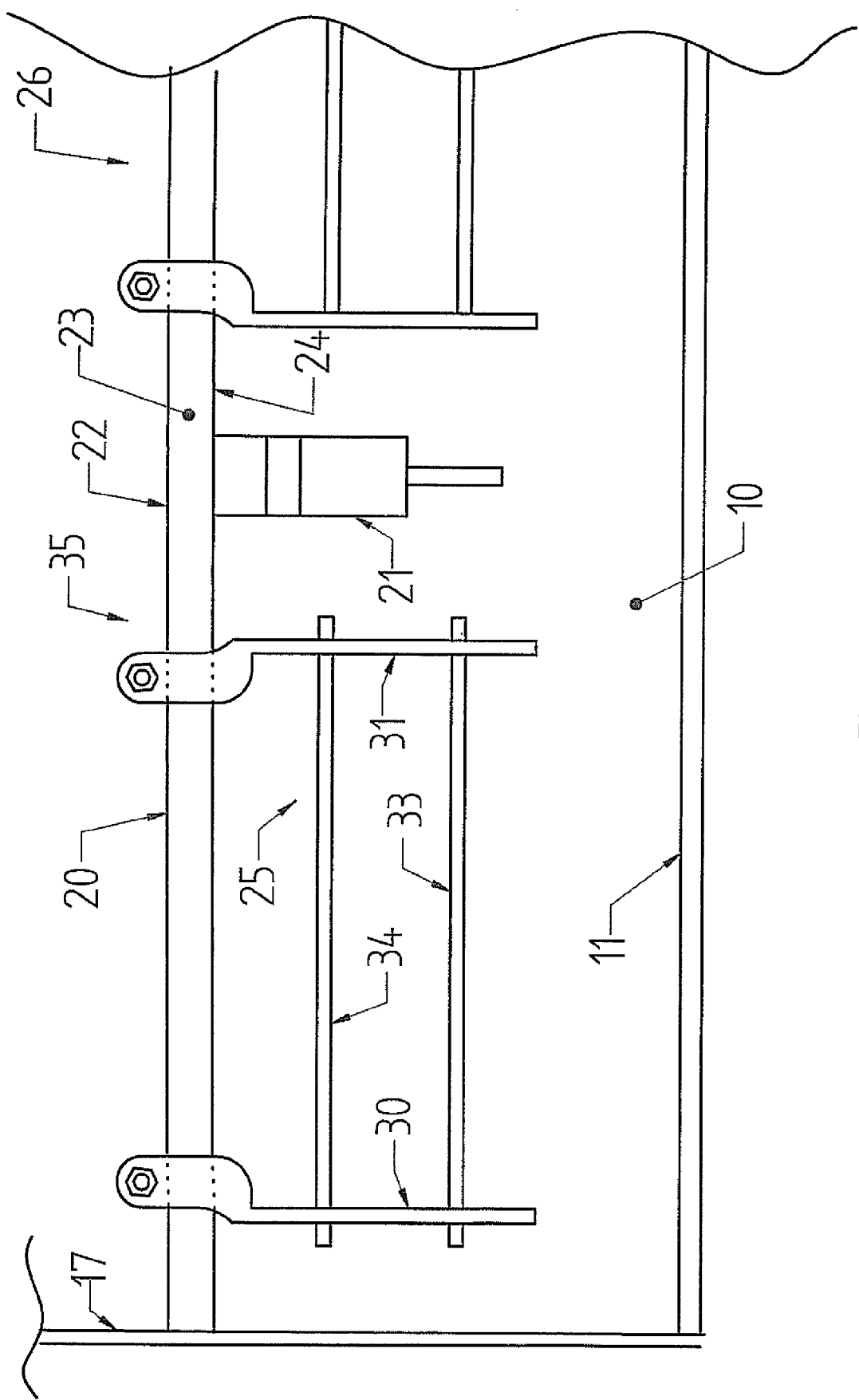
FIG. 2 is a longitudinal side elevational view of the water pipe and dividers of FIG. 1.
Figure 3:
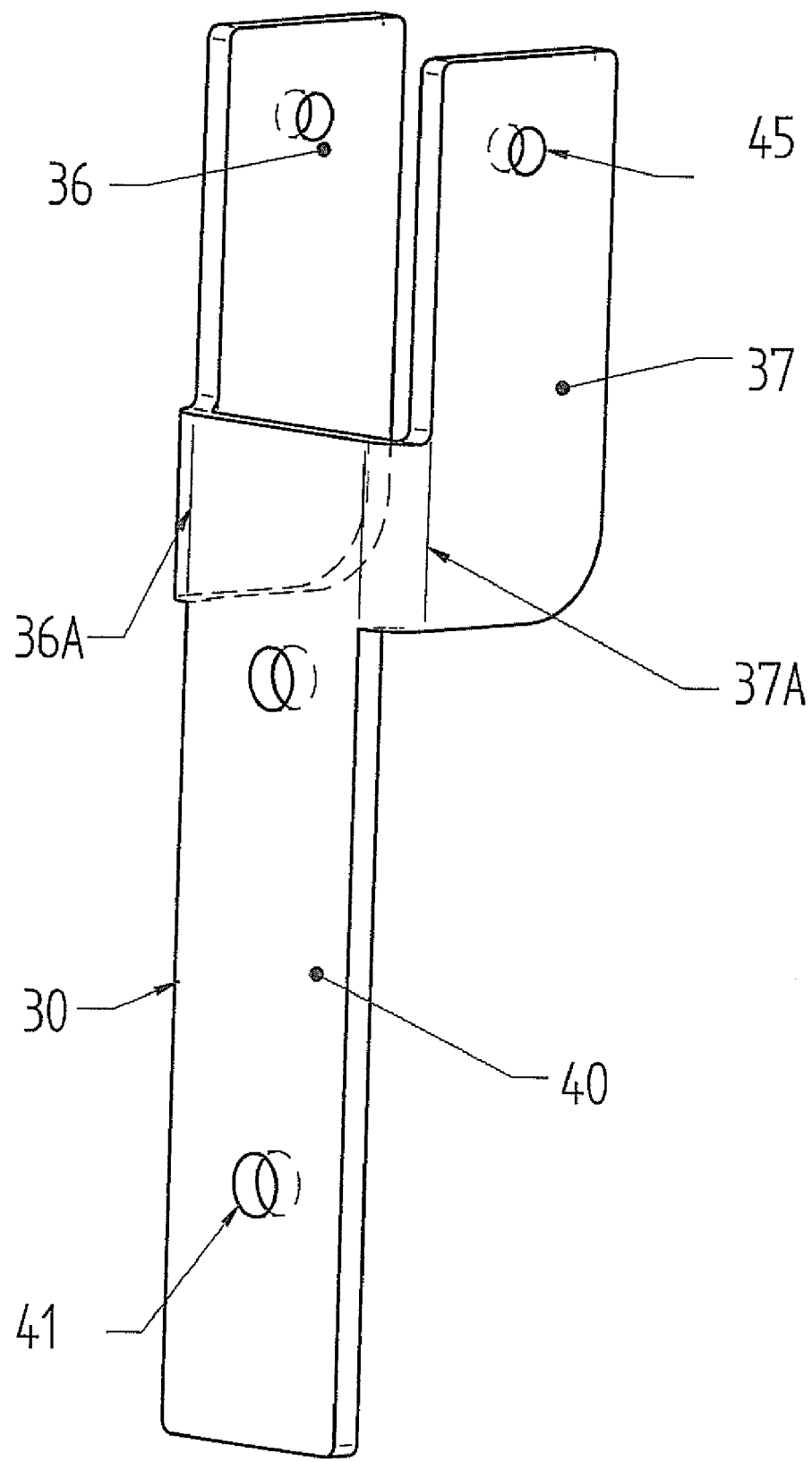
FIG. 3 is an isometric view of one leg of the dividers of FIG. 1.

A feeder of the general type as shown in the above patents, the disclosure of which is incorporated herein by reference, is shown in the figures and is arranged to provide a feeder for feeding animals as they grow from a first smaller size to a larger size. The feeder includes a trough 10 having a base 11, a first side wall 12 along one side edge over which the animals on one side can reach for taking feed from the trough and a second side wall 12A along an opposed side edge over which the animals on the opposed side can reach for taking feed from the trough;

A shelf 13 is mounted above the base 11 of the trough and is arranged at a height such that the animals reaching over one of the sides 12, 12A of the trough can take feed from an adjacent one of the two sides 14 and 15 of the shelf 13 while reaching over the side wall and such that feed falling or knocked from the shelf by the animal is collected in the trough;

A feed hopper 16 is positioned above the shelf for depositing feed onto the shelf, the hopper having a lowermost edge arranged at a distance from the shelf which distance acts to control an amount of feed discharged from the hopper onto the shelf, and which distance together with the relative locations of the shelf and the lowermost edge acts to maintain the feed discharged on the shelf unless moved from the shelf by the animal. The feeder has end walls 17 at right angles to its length completing the end of the hopper and the end of the trough.

A water pipe 20 extends along the full length of the trough at a position underneath the shelf 13 and carries a plurality of water nipples 21 of a conventional nature at spaced positions along the water pipe. The water nipples are directed downwardly and are arranged to be pushed by the animal to discharge water into the trough.

The water pipe is formed of rectangular or more preferably square tube with a top wall 22, two side walls 23 and a bottom wall 24.

A plurality of divider members 25, 26 et seq mounted on the pipe each between two of the water nipples 21 such that the divider members together act to separate one side of the trough from the other side to prevent the passage therebetween of the animals when at the smaller size. Thus each of the divider members comprises a pair of depending legs 30 and 31 extending from the pipe to a position close to the base 11 with at least one cross bar and preferably a series of cross bars 33, 34 interconnecting the legs at parallel spaced heights so as to prevent the animals from passing through.

Each of the legs has at its upper end a clamping member 35 defining a pair of side portions 36 and 37 for engaging sides 23 of the water pipe 20 and a clamping fastener or bolt 38 for pulling the side portions or plates 36 and 37 together in a clamping action on the sides 23.

Each leg 30 is formed from a flat metal plate portion 40 with holes 41 for the bars. The respective clamping member is formed by portions 36 and 37 of the metal plate defining the leg portion 40 which is bent at right angles to the plane of the leg while the leg portion itself lies in a plane at right angles to the tube.

The flat metal plate portion 40 forming the leg has a width substantially equal to the bottom wall 24 of the rectangular tube 20 and the clamping portions are formed at the sides of the leg 40 at the upper end. Thus a generally Y-shaped metal piece is stamped or cut and the portions 36 and 37 are bent forwardly at bend lines 36A and 37A. Thus the portions 36 and 37 lie parallel to the sides 23 and to each other and at right angles to the leg portion 40.

The clamping portions extend to a height above the top wall 22 of the rectangular tube and the clamping bolt 38 bridges the tube and connects the portions above the top wall 22 passing through holes 45 in the upper part of the portions 36 and 37.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A feeder for feeding animals as they grow from a first smaller size to a larger size, comprising:

a trough having a base, a first side wall along one side edge over which the animals on one side can reach for taking feed from the trough and a second side wall along an opposed side edge over which the animals on the opposed side can reach for taking feed from the trough;

a shelf mounted above the base of the trough and arranged at a height such that the animals reaching over one of the sides of the trough can take feed from an adjacent one of the two sides of the shelf while reaching over the side wall and such that feed falling from the shelf is collected in the trough;

a feed hopper positioned above the shelf for depositing feed onto the shelf, the hopper having a lowermost edge arranged at a distance from the shelf which distance acts to control an amount of feed discharged from the hopper onto the shelf, and which distance together with the relative locations of the shelf and the lowermost edge acts to maintain the feed discharged on the shelf unless moved from the shelf by the animal;

a water pipe formed from a rectangular tube and extending along the trough at a position underneath the shelf;

at least one water nipple on the water pipe;

at least one divider member mounted on the pipe and extending therealong to separate one side of the trough from the other side to prevent the passage therebetween of the animals when at the smaller size;

said at least one divider member comprising a pair of depending legs with at least one cross bar interconnecting the legs;

each of the legs having at its upper end a clamping member defining a pair of side portions for engaging sides of the rectangular tube and a clamping fastener for pulling the side members together in a clamping action.

2. The feeder according to claim 1 wherein each leg is formed from a flat metal plate and the side portions are formed by portions of the metal plate.

3. The feeder according to claim 2 wherein the flat metal plate lies in a plane at right angles to the tube and the side portions of the metal plate forming the clamping member are bent at right angles to the plane of the leg.

4. The feeder according to claim 2 wherein the flat metal plate forming the leg has a width substantially equal to a bottom wall of the rectangular tube and the side portions of the metal plate forming the clamping member are formed at the sides of the leg at the upper end of the leg.

5. The feeder according to claim 1 wherein the side portions forming the clamping member extend to a height above a top wall of the rectangular tube and wherein the clamping fastener bridges the tube and connects the portions above the top wall.

* * * * *